United States Patent
Vallejo Manyari

(10) Patent No.: US 9,779,637 B2
(45) Date of Patent: Oct. 3, 2017

(54) BOARD DESCRIBING OR SHOWING REALITY IN FOUR DIMENSIONS, A UNIVERSAL PLOTTER AND A SCIENTIFIC MEASUREMENT AND LEARNING TOOL

(71) Applicant: Jorge Alfonso Jesus Vallejo Manyari, Lima (PE)

(72) Inventor: Jorge Alfonso Jesus Vallejo Manyari, Lima (PE)

( * ) Notice: Subject to any disclaimer, the term of this patent is extended or adjusted under 35 U.S.C. 154(b) by 0 days.

(21) Appl. No.: 15/040,494

(22) Filed: Feb. 10, 2016

(65) Prior Publication Data

US 2016/0163231 A1 Jun. 9, 2016

Related U.S. Application Data

(63) Continuation-in-part of application No. 13/639,440, filed as application No. PCT/IB2010/001314 on May 26, 2010, now abandoned.

(30) Foreign Application Priority Data

Apr. 5, 2010 (PE) .............................. 204-1010/DIN

(51) Int. Cl.
| | |
|---|---|
| *G09B 23/06* | (2006.01) |
| *B43L 1/04* | (2006.01) |
| *B43L 13/00* | (2006.01) |
| *B43L 5/00* | (2006.01) |
| *B43L 1/00* | (2006.01) |

(52) U.S. Cl.
CPC ................ *G09B 23/06* (2013.01); *B43L 1/00* (2013.01); *B43L 1/045* (2013.01); *B43L 5/002* (2013.01); *B43L 5/005* (2013.01); *B43L 13/00* (2013.01); *Y02T 10/82* (2013.01)

(58) Field of Classification Search
CPC .......... G09B 23/06; G09B 25/02; B43L 13/00; B43L 13/02
USPC .............. 434/300; 33/18, 432, 433, 441, 445
See application file for complete search history.

(56) References Cited

U.S. PATENT DOCUMENTS

| | | | | |
|---|---|---|---|---|
| 4,738,029 | A * | 4/1988 | Held ...................... | B43L 13/022 33/1 M |
| 5,647,135 | A * | 7/1997 | Fuentes ................. | B43L 13/022 33/1 M |
| 2002/0138228 | A1* | 9/2002 | Faulkner ................ | G09B 25/06 702/138 |

* cited by examiner

*Primary Examiner* — Robert J Utama
*Assistant Examiner* — Robert P Bullington
(74) *Attorney, Agent, or Firm* — Sheridan Ross P.C.

(57) ABSTRACT

The present invention relates to a metal-sheet board or blackboard with magnetic features having two or three movements, which plots and represents reality in four dimensions (horizontal, vertical, depth and time) and which describes reality objectively, in which a T-shaped ruler is moved on a rail along the horizontal or X axis by a digital stepper motor controlled by a driver and software on the computer (horizontal movement). Furthermore, a tool truck surrounding the T-shaped ruler moves along the entire length (vertical movement) or Y axis thereof, actuated by a digital stepper motor controlled by a driver, which is in turn controlled by software on the computer, with these two movements controlled by mathematical speed and acceleration functions.

6 Claims, 2 Drawing Sheets

BOARD DESCRIBING OR SHOWING REALITY IN FOUR DIMENSIONS, A UNIVERSAL PLOTTER AND A SCIENTIFIC MEASUREMENT AND LEARNING TOOL

CROSS REFERENCE TO RELATED APPLICATIONS

This Non-Provisional Application is a Continuation-in-Part of U.S. patent application Ser. No. 13/639,440, filed Oct. 4, 2012, which is a National Stage Entry of PCT/IB2010/00314, filed May 26, 2010, which claims priority to Peruvian Patent Application No. 204-1010/DIN filed Apr. 5, 2010, all of which are incorporated by reference in their entireties.

FIELD OF THE TECHNOLOGY

The invention relates to the field of boards or panels that represents reality in its four dimensions (horizontal, vertical, depth and time), universal plotter, learning and scientific measurement tool, that describes reality in an objective way, from a small to a big format facilitating learning of sciences through graphics, draws, labs or real representations with help of a measurement tool or multiple sensors connected electronically to the legs of input and/or output, at the disposal of computer software.

BACKGROUND

The main problem is the improvement and modernization of learning in classrooms. Normally, the teacher uses conventional boards to develop his class—for example mathematics or physics—using only drawing skills and brackets, without any tool that has neither parameters nor real technological help, causing imprecision, therefore inefficiency in learning.

Nowadays, many schools project images from the computer using a searchlight in an electronic white board, being this action or interactivity always virtual, contributing to improvement and modernity of learning in classrooms, but having as a disadvantage lacking real and three-dimensional measurement tools.

Further, we know that nature has all the sciences and these are represented by graphics, that in turn will always be represented in the coordinate plane X, Y (width, height), and if a tool will also help in representing depth or axis Z, then this will be of great help in comprehension of nature and learning improvement.

SUMMARY

The present invention relates to a metal-sheet board or blackboard with magnetic features having two or three movements, which plots and represents reality in four dimensions (horizontal, vertical, depth and time) and which describes reality objectively, in which a T-shaped ruler is moved on a rail along the horizontal or X axis by a digital stepper motor controlled by a driver and software on the computer (horizontal movement). Furthermore, a tool truck surrounding the T-shaped ruler moves along the entire length (vertical movement) or Y axis thereof, actuated by a digital stepper motor controlled by a driver, which is in turn controlled by software on the computer, with these two movements controlled by mathematical speed and acceleration functions. A felt-tip pen or marker is placed in the tool truck against the surface of the blackboard in order to plot all manner of figures. Furthermore the tool truck includes a third motor providing movement perpendicular to the blackboard (depthways), together with the respective motor and driver thereof. Different scientific measurement tools and structures are mounted on the board or the tool truck and connected electronically to the different data input or output pins available on the blackboard by means of the driver and the related software on the computer, providing a real scientific measurement and laboratory instrument that interacts with the computer.

It is one aspect of the present invention to provide a board or metal panel wherein through the horizontal or x axis, a rail at the top is placed and on this a T-shaped rule moves, connecting two pairs of pulleys into it, making its route through its horizontal length; and through the T-shaped ruler or vertical a tool holder car is moved along the vertical length, powered by two digital engines instructed by mathematical functions of velocity and acceleration respectively, handled by its controllers and the controllers driven from a software in the computer; likewise, a third axis z of depth is placed perpendicular and with movement also perpendicular to the board or panel (x, y) driven by a third digital motor fixed on the tool holder car and mounted by its respective controller and software in the computer, which serves to drive mechanisms with mass, inertia, forces connected to the tool holder car.

In various embodiments of the above aspect, any tracers or drawings on the tool holder car are electronically connected to the output pins or data input to the tool holder car, also the tool holder car is controlled form the computer via software, with its respective horizontal and vertical movements, making all kinds of graphics, drawings, and paintings on the same board or metal panel; the cable wraps around the half to two-lane pulley, placing from outside the pulley two pins which assure the desired path is followed in order ensure the cable does not mount; through the depth axis or Z-axis a tracer and a drawing tool moves for several tracers, which is fixed on the tool holder car; in the surface of the board several mechanisms, sensors, or constructions are collocated due to the fixing and magnetic characteristics of the board; in the surface or in the tool holder car are fixed measuring instruments, screen display, power terminal blocks, mechanisms and sensors, which are connected to the input pins and/or output data with their respective drivers and software on the computer; and wherein the board or metal panel rotates on its horizontal or X-axis, obtaining different positions and holding the constructions or mechanisms magnetized on it.

It is another aspect of the present invention to provide a board or panel having a board, a T-shaped ruler, wherein the T-shaped ruler is defined by two portions, a horizontal portion and a vertical portion, the horizontal portion defining a horizontal axis or x-axis and the vertical portion defining a vertical axis or y-axis and; a first set of pulleys; a second set of pulleys; a third set of pulleys; a tool holder carriage; a pivot of rotation on which the board rotates; wherein a first rail is mounted on the board and on which the horizontal portion of the T-shaped ruler is positioned and wherein on the first rail the horizontal portion of the T-shaped ruler moves towards the horizontal axis or x-axis through the first set of pulleys on which a first cable pulls the T-shaped ruler; wherein the tool holder carriage is positioned displaceably on a second rail, the second rail is defined by the vertical portion of the T-shaped ruler towards the vertical axis or y-axis, and wherein the tool holder carriage moves through the second set of pulleys on which a second cable pulls the T-shaped ruler; wherein a third rail is mounted on the tool holder carriage, the third rail assembled so as to define an axis of depth or z-axis that is perpendicular to the plane formed by the horizontal axis or x-axis and the vertical axis or y-axis; and wherein on the third rail a tool stroke moves through the third set of pulleys, this third set of pulleys is mounted on the tool holder carriage, which performs two movements in the vertical axis or y-axis and depth axis or z-axis, wherein the stroke tool traces a plane (Y, Z) perpendicular to the plane of the board (X, Y).

In various embodiments of the above aspect, the first set of pulleys, the second set of pulleys and the third set of pulleys comprise idler pulleys, drive pulleys, and a pair of pulleys fastened to the rails; the engines are fixed by the drive pulleys, being instructed by mathematical functions of speed and acceleration, driven by their controllers; measuring instruments, tracers, sensors, mass, force gauges, displays, power terminal blocks, mechanical constructions, and electromagnetic mechanisms are fixed to the surface of the board or tool holder carriage by means of magnetic, electromagnetic, or mechanical fasteners; measuring instruments, tracers, sensors, mass, force gauges, displays, power terminal blocks, mechanical constructions, and electromagnetic mechanisms are connected to input/output pits of data and power terminal block of the controller; and any type of tracers are placed on the tool holder carriage, the tracers are connecting to the input/output pits of data and power terminal block, these tracers are driven by an electromagnetic mechanism and controlled from a control unit in which the tracers make two movements in the horizontal axis or a X-axis and vertical axis or Y-axis, making strokes on the plane of the board or plane (X, Y).

DETAILED DESCRIPTION OF THE DRAWINGS

Figure 1:
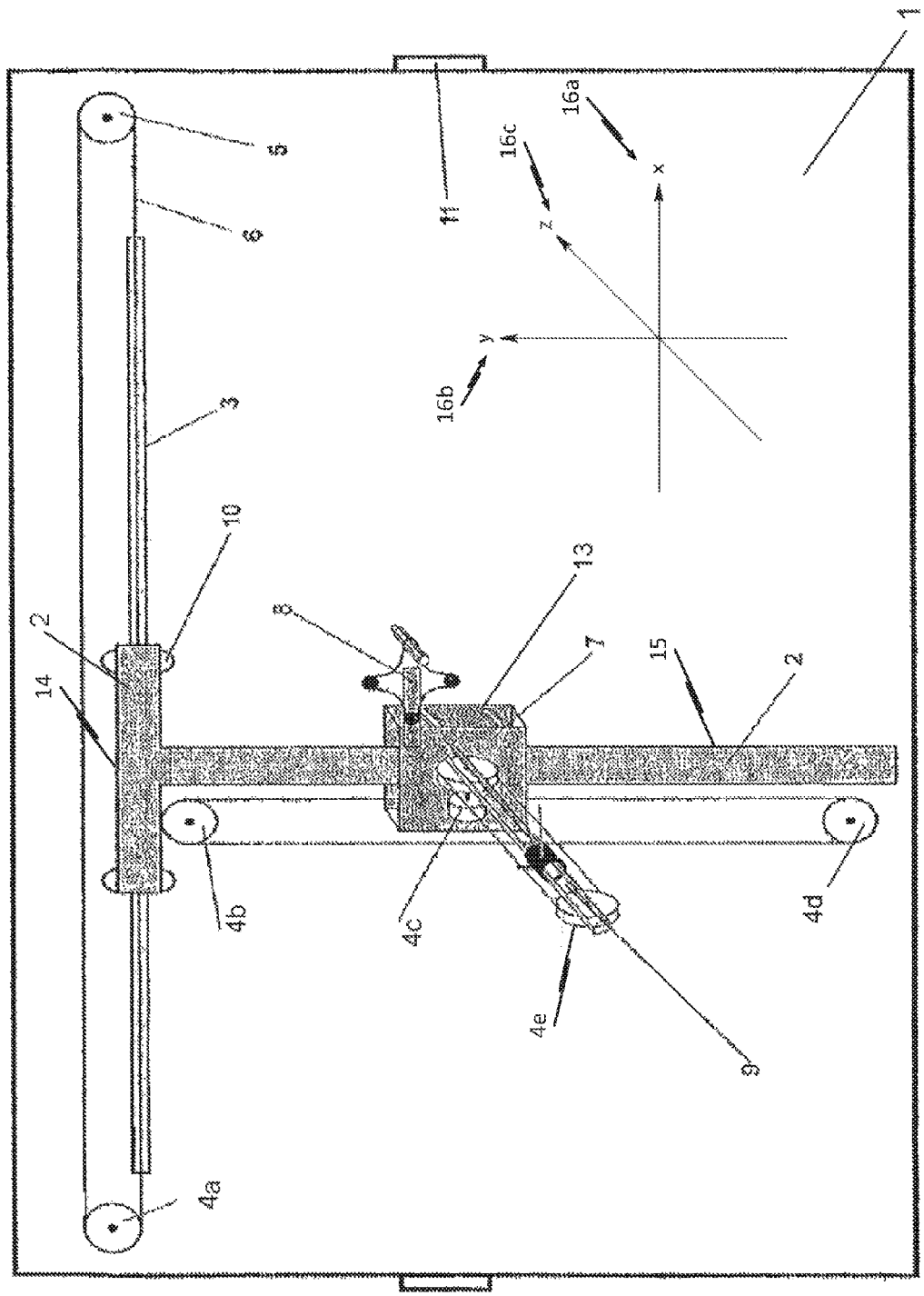
FIG. 1 shows an elevated perspective view of one embodiment of a 4-dimensional plotting machine.

As shown in FIG. 1, the surface of the board or metal plate panel (1) may include a T-shaped ruler (2) that moves across the horizontal length. The T-shaped ruler moves along a steel tube rail (3). Moreover, a double lane pulley (4a, 4b, 4c, 4d) is mounted on the respective digital engines where velocity and acceleration movements are further handled by controllers which in turn are managed by mathematical functions from computer software. A free movement pulley (5) further limits the movement in the horizontal direction. The movement mechanisms or system movements are dragged through the use of a cable (6). A tool holder car (7) moves in the vertical direction across the length of the T-shaped ruler (2) and has mechanisms of fixation (13) for the difference accessories or tools which may be mounted on the tool holder car (7). Moreover, stroke and drawings tools (8) for various tracers may be included. Extending in the z-axis or depth axis and mounted in the tool holder car (7) is a respective digital engine and displacement mechanism (9). The T-shaped ruler (2) may be moved horizontally through the use of wheels and pulleys (10) that embrace the rail (3) on which the T-shaped ruler moves. The device may further include a panel rotation pivot (11) for positioning in horizontal shape and pins (12) which address the cable trajectory in the double lane pulley (4).

As shown in FIG. 1, an embodiment of the present disclosure comprises a board 1 or panel having a board 1, a T-shaped ruler 2, wherein the T-shaped ruler 2 is defined by two portions, a horizontal portion 14 and a vertical portion 15, the horizontal portion 14 defining a horizontal axis or x-axis 16a and the vertical portion 15 defining a vertical axis or y-axis 16b and; a first set of pulleys (4a, 5); a second set of pulleys (4b, 4d); a third set of pulleys (4c, 4e); a tool holder carriage 7; a pivot of rotation 11 on which the board 1 rotates; wherein a first rail 3 is mounted on the board 1 and on which the horizontal portion 2a of the T-shaped ruler 2 is positioned and wherein on the first rail 3 the horizontal portion 2a of the T-shaped ruler 2 moves towards the horizontal axis or x-axis 16a through the first set of pulleys (4a, 5) on which a first cable 6 pulls the T-shaped ruler 2; wherein the tool holder carriage 7 is positioned displaceably on a second rail 15, the second rail 15 is defined by the vertical portion 15 of the T-shaped ruler 2 towards the vertical axis or y-axis 16b, and wherein the tool holder carriage 7 moves through the second set of pulleys (4b, 4d) on which a second cable pulls the T-shaped ruler 2; wherein a third rail 14 is mounted on the tool holder carriage 7, the third rail 14 assembled so as to define an axis of depth or z-axis 16c that is perpendicular to the plane formed by the horizontal axis or x-axis 16a and the vertical axis or y-axis 16b; and wherein on the third rail 14 a tool stroke 9 moves through the third set of pulleys (4c, 4e), this third set of pulleys (4c, 4e) is mounted on the tool holder carriage 7, which performs two movements in the vertical axis or y-axis 16b and depth axis or z-axis 16c, wherein the tool stroke 9 traces a plane (Y, Z) perpendicular to the plane of the board 1 (X, Y).

Figure 2:
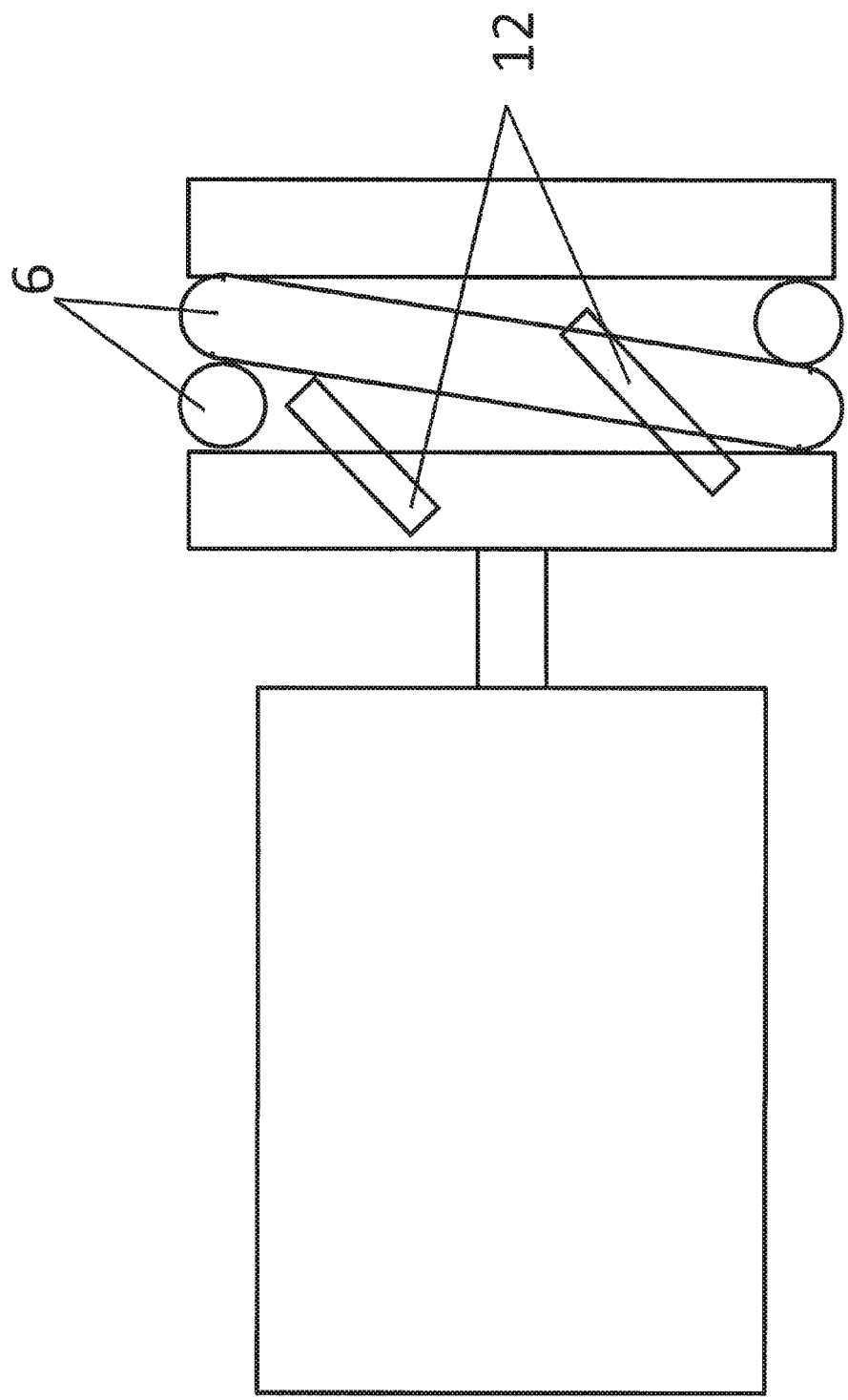
FIG. 2 shows a detailed view of an embodiment of the guider lane pulleys of a 4-dimensional plotting machine.

A detailed view of the guider pins (12) and cable (6) on the double lane pulleys (4a, 4b, 4c, 4d) is shown in FIG. 2. In the embodiment shown, two guider pins (12) are present in the double lane pulleys (4) which aid in changing the trajectory of the cable (6) within the double lane pulleys (4). Mechanism and Electronics.

It is a metal plate board or panel (1) that in a magnetic form can attach multiple accessories, sensors and measuring instruments. It has different small and very large formats, with two movements: vertical and horizontal (two-dimensional), in which moves a tool holder car (7), and a third Z-axis movement of depth (three dimensional). Because of its construction, it rotates or spins on its horizontal, making the same performances.

The mechanism by which movements of the horizontal and vertical axis (X, Y) are actuated involves a cable (6) that wraps the double lane pulley (4) a turn and a half, latter goes mounted in a digital engine and it is tied to its movement by a key joint, the cable (6) goes to the other end and passes through a free pulley (5) of one lane, then in the return, ties the T-shaped ruler (2), goes out and returns to the drive pulley, which generates that the cable (6) (when it is tense) is fixed to the pulley and tied to the movement of the engine. However, the cable (6) will mount with itself in the double lane pulley (4) following its trajectory, then from out of the pulley we put two entrainment pins (12), which make the cable (6) change its trajectory without mounting (This system is equal for axis X and Y and optional for the Z axis). Further, in one end of the cable (6) exists a tension indicator of the cable (6), a spring that provides the necessary adjustment.

The direction of movement of axis X (horizontal) is on a rail (3) (stainless steel tube) by which the T-shaped ruler (2) moves and where are fixed to pairs of pulleys (4, 5) of concave channel that describe the same shape of the rail (3), and look like a "sandwich".

The direction of movement of the tool holder car (7) in the Y axis (vertical) is wrapping the rectangular section of the T-shaped ruler (2) through four pulleys (4), which makes it slide across the entire length.

The tool holder car (7) and the board (1) have various options to be anchor or fixed like: threaded holes, screws, visualization display, terminal blocks of energy, input and output data pins, sensors, measurement instruments, mechanisms and tools are fixed on them, for the various activities to develop. Also fixed in the tool holder car (7) are the drawing or tracers mechanisms and the motor driving the Z axis or depth axis. Because of its construction all this board or panel (1) turn on its horizontal axis repositioning but doing the same performance.

The board (1) has electronic modules, including at least a first module, a second module, a third module, and a fourth module, to do its job.

The first module with the supply to the entire system is a dedicated power source for feeding the engine drivers (drivers) and also to power the interface module.

The second module is the interface between the personal computer ("PC") and the hardware; this has two peripheral interface controllers ("PICs") which are in charge of receiving the orders from the PC and send them to the execution mechanisms.

The third and fourth modules are drivers (controllers) which handle the movement of the coordinate axis through the engines; they also control the number of inputs and output of the available data that will connect those different processes.

Optionally, the board (1) can connect to a screen or display that shows the job done in the PC.

It will also develop in multiple applications in engineering, architecture, design, simulation, arts, models, etc.

EXAMPLES

Mathematical Area: "Lineal Equations"

Here we will explain how mathematics expressions, formulas or functions can be represented in reality, for example in the expression X+4=0, we can represent this incognita by horizontal displacement in a time interval or another process, then determine the unitary parameter and resolve it, understanding in a better way the expression.

Also and equally clearly, the linear function Y=mx+4 is taken to reality displacing the horizontal axis from the computer software a quantity of X units, and at the same time the Y displacement will be affected by the product of mX, if we start the engines at the same time will see the slope generation and also observe that the positive parameter 4 do not affect the slope, but does it with its position. This formulas and variables are sent from our software interacting in a real way. This representation will contribute clearly to learning.

Physics Area: "Acceleration"

We suspend a mass via a thread and mounted on the tool holder car, then increase the speed of displacement in our horizontal or X axis, we observe that the mass does not accompany the displacement, due to the inertia effect, this mass move away from the vertical, then if we decelerate displacement, we note that the mass moves away in the opposite direction, however when we impart a constant speed, now the mass does accompany the vertical without leaving its perpendicularity.

In Engineering

This board or panel develops to scale multiple processes and automations, since having different movements would help it interact with various measuring tools such as: Weighing Scales, scales, dynamometers, mechanical forms, etc., aided by the magnetic characteristic and supported by various sensors connected to the legs of input or output of the data available in the controller, to or from the respective software on the computer that would facilitate the study of the engineering process raised.

In Architecture

It becomes a real drawing board or hybrid because it would build up on the tremendous advantages of printing graphics from the computer (movement in X, Y) and also would be a conventional drawing board that rotates about its horizontal axis, with brackets that now contain multiple sensors connected to the computer software, with depth Z axis movement, if also magnetized objects can be fixed to the board and this rotated about its horizontal, these factors together will make it possible the scale representation of the three-dimensionality and all interaction help with mechanisms such as the lighting, that would benefit the designer.

It is a metal plate board with different magnetic characteristics of small or very large formats of two and three movements, in which a T-shaped ruler driven by a digital engine (stepper motor) moves on a rail across all its horizontal or X axis, handled by a controller (driver) and from there to a software on the computer (horizontal motion). Likewise, a tool holder car moves wrapping the T-shaped ruler, making a path of its entire length or vertical axis driven by a digital engine (stepper motor) handled by a controller (driver) and this to a computer software (vertical movement).

With these two horizontal and vertical (X, Y) movements, driven by their respective engines instructed by mathematical functions of velocity and acceleration developed in our software we can move across the surface of the board or panel with accuracy, and putting in the tool holder car a chalk, marker, airbrush, ink jet or any type of tracer, which is driven against the board or panel by an electromagnetic mechanism controlled by the software, we can draw or print the entire universe of graphs in science, math and drawings on the same board, paper, cloth or canvas.

The third depth or Z axis with perpendicular motion to the board is also placed together with a third engine mounted in the tool holder car to its driver and software on the computer, the instrument becomes a renderer and maker of constructions, simulations, processes, automations and models in the three dimensional space.

This board can also rotate around its horizontal axis and due to its metallic magnetic characteristic would hold attach the objects and constructions.

In the tool holder car, even over the same board, different measurement tools are placed (scaler, scale, stopwatch, dynamometer, ammeter, etc.) or a multiplicity of sensors (mechanical, optical, motion, temperature, magnetic, electromagnetic, infrared, etc.), so it becomes a multiple-use lab tool, these sensors or measurement tools are connected electronically to the input or output pins of data to disposition of the controller (PIC), so it is possible to collect or send measurements or data to the respective software in the computer.

This board also has an electronic part formed by a power supply, which will have terminal blocks connected to the board to energize various components of the lab.

This board also has a screen or visualization display.

What is claimed is:
1. A board or panel, characterized by comprising:
a board (1);

a T-shaped ruler (2), wherein the T-shaped ruler is defined by two portions, a horizontal portion and a vertical portion, the horizontal portion defining a horizontal axis or x-axis and the vertical portion defining a vertical axis or y-axis and;

a first set of pulleys;

a second set of pulleys;

a third set of pulleys;

a tool holder carriage (7);

a pivot of rotation (11) on which the board rotates (11);

wherein a first rail (3) is mounted on the board (1) and on which the horizontal portion of the T-shaped ruler (2) is positioned and wherein on the first rail (3) the horizontal portion of the T-shaped ruler (2) moves towards the horizontal axis or x-axis through the first set of pulleys on which a first cable pulls the T-shaped ruler (2);

wherein the tool holder carriage (7) is positioned displaceably on a second rail, the second rail is defined by the vertical portion of the T-shaped ruler (2) towards the vertical axis or y-axis, and wherein the tool holder carriage (7) moves through the second set of pulleys on which a second cable pulls the T-shaped ruler (2);

wherein a third rail is mounted on the tool holder carriage (7), the third rail assembled so as it defines an axis of depth or z-axis that is perpendicular to a plane formed by the horizontal axis or x-axis and the vertical axis or y-axis, and wherein on the third rail a tool stroke moves (9) through the third set of pulleys, this third set of pulleys is mounted on the tool holder carriage, which performs two movements in the vertical axis or y-axis and depth axis or z-axis, wherein the stroke tool traces a plane (Y, Z) perpendicular to the plane formed by the horizontal axis or x-axis and the vertical axis or y-axis.

2. The board or panel according to claim 1, wherein the first set of pulleys, the second set of pulleys and the third set of pulleys comprise idler pulleys, drive pulleys and a pair of pulleys fastened to the rails.

3. The board or panel according to claim 2, wherein one or more engines are fixed by the drive pulleys, the one or more engines being instructed by mathematical functions of speed and acceleration, the one or more engines driven by controllers.

4. The board or panel according to claim 1, wherein measuring instruments, tracers, sensors, mass, force gauges, displays, power terminal blocks, mechanical constructions and electromagnetic mechanisms are fixed to a surface of the board or tool holder carriage by means of magnetic, electromagnetic or mechanical fasteners.

5. The board or panel according to claim 4, wherein measuring instruments, tracers, sensors, mass, force gauges, displays, power terminal blocks, mechanical constructions and electromagnetic mechanisms are connected to input/output pins of data and power terminal block of a controller.

6. The board or panel according to claim 5, wherein any type of tracers are placed on the tool holder carriage, the tracers are connecting to the input/output pits of data and power terminal block, these tracers are driven by an electromagnetic mechanism and controlled from a control unit in which the tracers make two movements in the horizontal axis or a X-axis and vertical axis or Y-axis, making strokes on the plane formed by the horizontal axis or x-axis and the vertical axis or y-axis.

* * * * *